United States Patent [19]

Fischer et al.

[11] 4,104,412

[45] Aug. 1, 1978

[54] METHODS AND SYSTEMS FOR MAKING AERATED CANDY

[75] Inventors: Harry A. Fischer, Frankenmuth; Richard R. Wrubel, Ann Arbor, both of Mich.

[73] Assignee: Baker Perkins Inc., Saginaw, Mich.

[21] Appl. No.: 826,400

[22] Filed: Aug. 22, 1977

[51] Int. Cl.$^2$ .......................... A23G 3/00; A23G 3/02
[52] U.S. Cl. .................................. 426/572; 426/660;
426/474; 366/97; 366/101
[58] Field of Search ...................... 426/572, 660, 474;
425/165, 238, 554; 366/97, 101

[56] References Cited

U.S. PATENT DOCUMENTS

| | | | |
|---|---|---|---|
| 2,197,919 | 4/1940 | Bowman | 426/4 |
| 2,600,569 | 6/1952 | Oakes | 426/474 |
| 3,985,909 | 10/1976 | Kirkpatrick | 426/572 |
| 3,985,910 | 10/1976 | Kirkpatrick | 426/572 |
| 4,001,457 | 1/1977 | Hegadorn | 426/572 |
| 4,004,040 | 1/1977 | Puta | 426/474 |

*Primary Examiner*—Jeanette M. Hunter
*Attorney, Agent, or Firm*—Learman & McCulloch

[57] ABSTRACT

A candy making system wherein a viscous candy mass is cooked and continuously fed through a closed chamber reactor wherein a gas, such as air under pressure, is homogeneously intermixed with the continuously proceeding melt product stream to incorporate gas bubbles of a predetermined microscopic size therein. The candy is cooked at a temperature well below its heat degradation temperature until a relatively high viscosity mass is obtained and the cooked viscosity is substantially maintained during the passage of the mass through the reactor chamber while elongated bubbles repeatedly created in the mass are repeatedly sliced when the product is forced through reduced size openings and a knife moves through the product at a speed such as to slice the elongated bubbles. The product is discharged from the chamber to atmosphere at the bubble slicing viscosity which may be described as "taffy-like".

8 Claims, 6 Drawing Figures

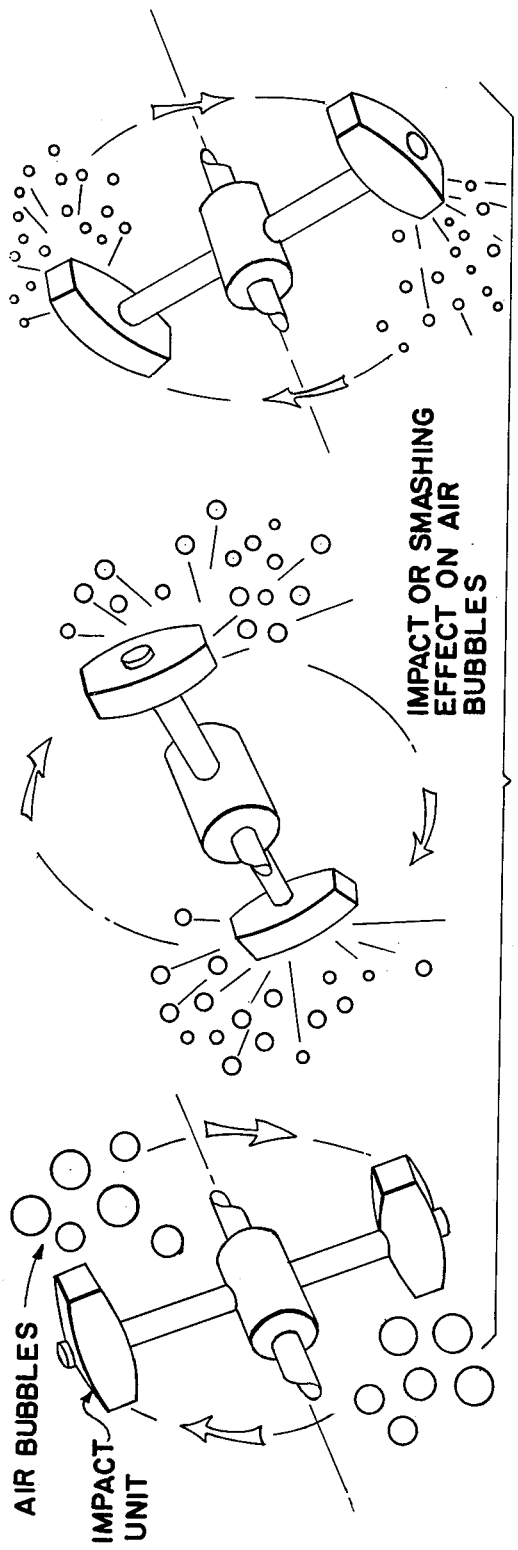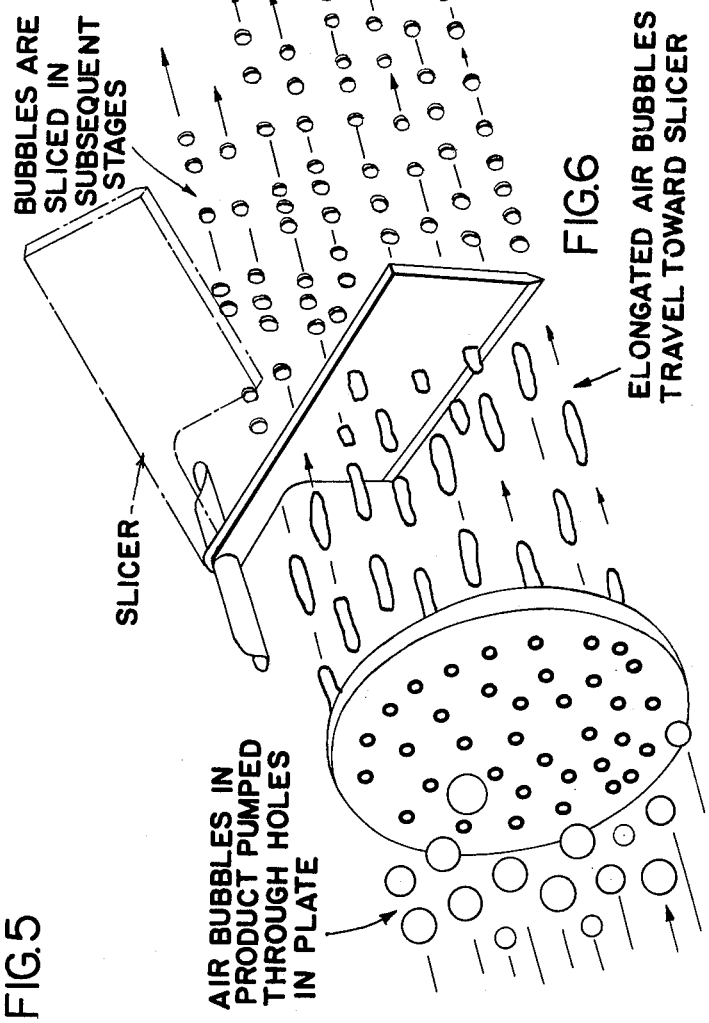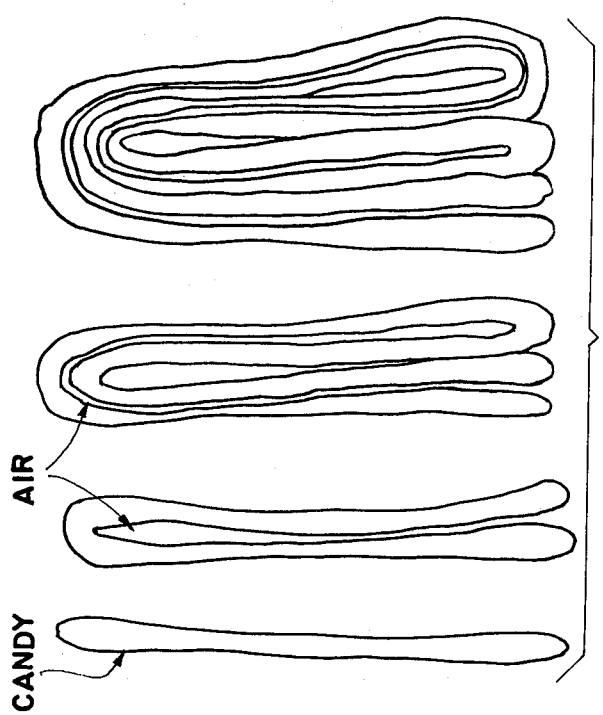

METHODS AND SYSTEMS FOR MAKING AERATED CANDY

The present invention is directed to a system for particularly making hard candy which incorporates gas bubbles for the purpose of decreasing its density and enhancing its appeal to the purchasing public. Typically today, and for a very long time, candy has been manufactured by subjecting it to a pulling and folding operation which entraps air in the product in a batch operation.

Other systems for making candies, and particularly those comprising a candy and chewing gum mixture, have been suggested and reference is made, for instance, to Bowman Pat. No. 2,197,919, granted Apr. 23, 1940, wherein air is mechanically incorporated in candy at a time when the viscosity of the candy mixture is low. In this process, the liquid candy mixture is beaten by high velocity paddles to achieve a subdivision of air bubbles which are incorporated with the low viscosity candy mixture. Thereafter, the candy mixture, with or without the additional incorporation of a chewing gum base, is moved through a cooling and extruding apparatus wherein its viscosity is increased to a point such that it can maintain the suspended air bubbles at the time of discharge to atmospheric conditions.

During the course of an investigation which was conducted, the following listed additional patents were drawn to applicant's attention:
2,538,466
3,000,618
3,012,893
3,066,707
3,081,069
3,164,107
3,167,034
3,170,608
3,254,801
3,349,438
3,652,062
3,985,909
3,985,910
4,001,457

One of the prime objects of the present invention is to provide an improved continuous method which homogeneously incorporates gas in a viscous candy mass and permits the release of the candy mass to atmosphere after a repeated series of gas bubble elongations and slicings. The improved system does not require movement of the mass through a cooling extruder prior to release.

Another object of the invention is to provide a system which manufactures a desired low density candy in an efficient and reliable manner and produces a stable product which does not require the addition of surface stabilizing agents to prevent coalescense and migration of the gas bubbles in the product.

Another object of the invention is to provide a system which need not operate at temperatures close to the product decomposition temperature and which, because gas incorporation is accomplished at lower temperatures, avoids the heat degradation sometimes encountered with prior processes.

Still a further object of the invention is to provide a system of the character described wherein a greater volume of air can be incorporated in high sugar content, hard candy mix by utilizing a back pressure to control the pressure in the gas incorporating chamber.

Other objects and advantages of the system will be pointed out specifically or will become apparent from the following description when it is considered in conjunction with the appended claims and the accompanying drawings wherein like numerals refer to like parts:

FIG. 4 is a view illustrating a prior art folding method for entrapping air in the candy mix;

FIG. 5 is a sequence drawing illustrating the smashing of air bubbles which is described in the prior art Bowman patent which was mentioned; and FIG. 6 is a schematic view illustrating the type of bubble subdivision which occurs in the method of the present invention.

SUMMARY OF THE INVENTION

An improved system for incorporating gas under pressure wherein a high viscosity candy mass is moved from the cooker through a pressurized closed container and gas bubbles, which are homogeneously blended in the candy mixture are elongated, and then sliced into sections when low velocity knives are moved through the product. The "work energy" input is removed from the candy mass as the mass moves through the chamber and the temperature of the product is controlled to substantially maintain the viscosity of the mass and prevent migration and coalescense of the subdivided bubbles. Finally, the mass, still at the bubble slicing viscosity, is discharged to atmosphere.

Figure 1:
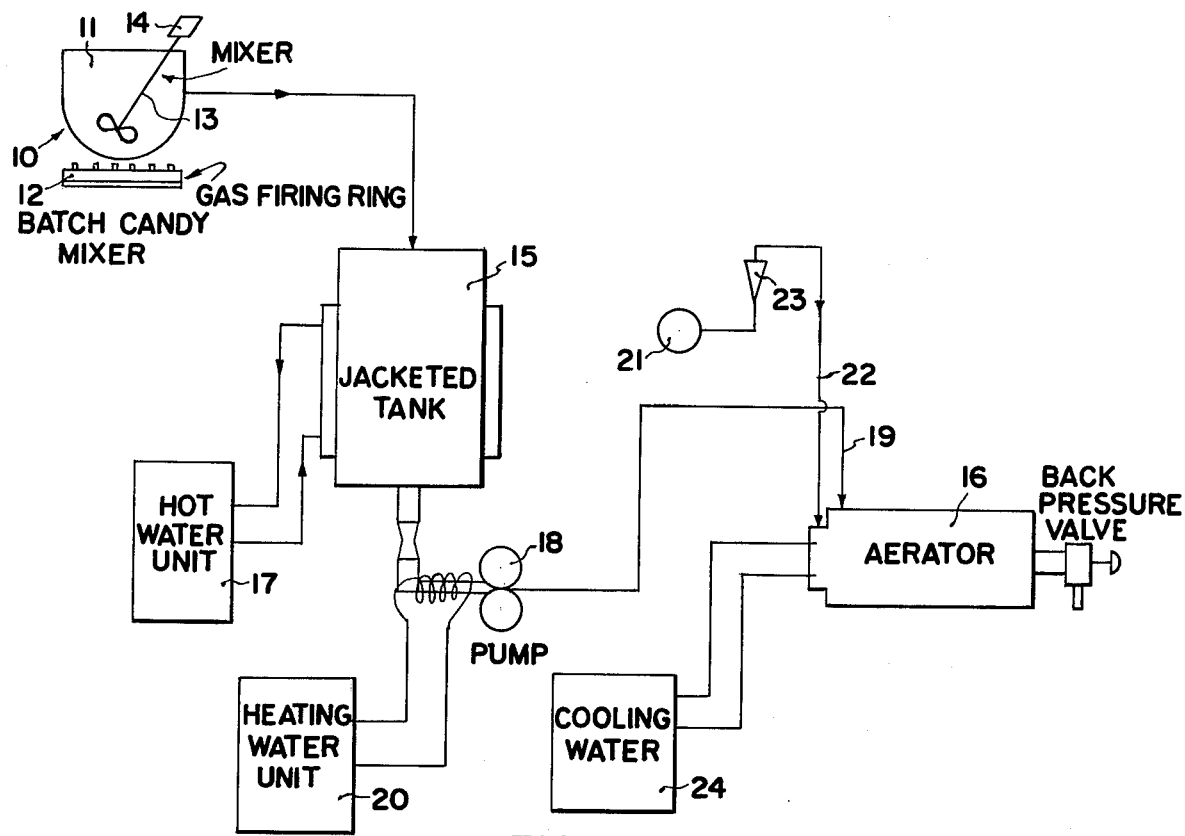
FIG. 1 is a schematic block diagram type view illustrating apparatus used in the system.

Referring now more particularly in the first instance to FIG. 1, a batch candy mixer, generally designated 10, is shown as including a vat 11, a heating unit 12, and a rotary blade mixer 13, powered by a motor 14. While preferably a continuous type candy ingredient cooker will be used, for the purpose of convenience, a batch mixer is shown as leading to a jacketed holding tank which is continuously maintained partly full of the viscous candy mass which is manufactured in the unit 10 so that it can continuously supply the candy mass to a processing unit generally designated 16, wherein the gas, such as air under pressure, is incorporated into the candy mix. A hot water circulating unit 17 may be provided for maintaining the temperature of the candy mass at the desired level in storage tank 15, and a pump 18 can be provided for moving the candy mass from the storage tank 15 to an aerator 16, which we also choose to term a reactor, via the line 19.

As noted, a hot water circulating unit 20 may also be provided for heating the discharge line 19 from tank 15 to maintain the mass sufficiently fluid for the pump 18 to operate efficiently. A suitable compressor 21 may be connected to the aerator 16 via line 22, and preferably has a gas flow meter 23 therein to meter measured amounts of air under pressure to the candy mass in a continuous manner. It is to be understood that reactor 16 is cooled, in a manner which will be described, by a recirculating cooling water unit 24 as shown.

In cooking unit 10, the candy mixture is heated to a cooking temperature - which typically may be of about 300° F. When cooking has been accomplished and the desired viscosity achieved, the candy is released, and its viscosity is maintained in tank 15, from which it is continuously pumped to the aerator 16. When the candy mass reaches reactor 16, it is still at a relatively high viscosity, i.e. in the range 1000 – 100,000 centipoises (cps). Its temperature has been allowed to cool only slightly from the cooking temperature and is significantly below a temperature at which heat degradation might occur. Basically, the viscosity utilized may be said to be the high viscosity which substantially is the viscosity at which the product is released from the cooker. The temperature at which it enters reactor 16, may typically be considered to be about 290° F. which is close to the temperature of release from the cooker. The material may be considered to incorporate about five percent moisture or less after cooking. With the present process, cooking can proceed at a lower temperature because a more viscous "out" product is desired, and heat degradation effects are accordingly minimized.

Figure 3:
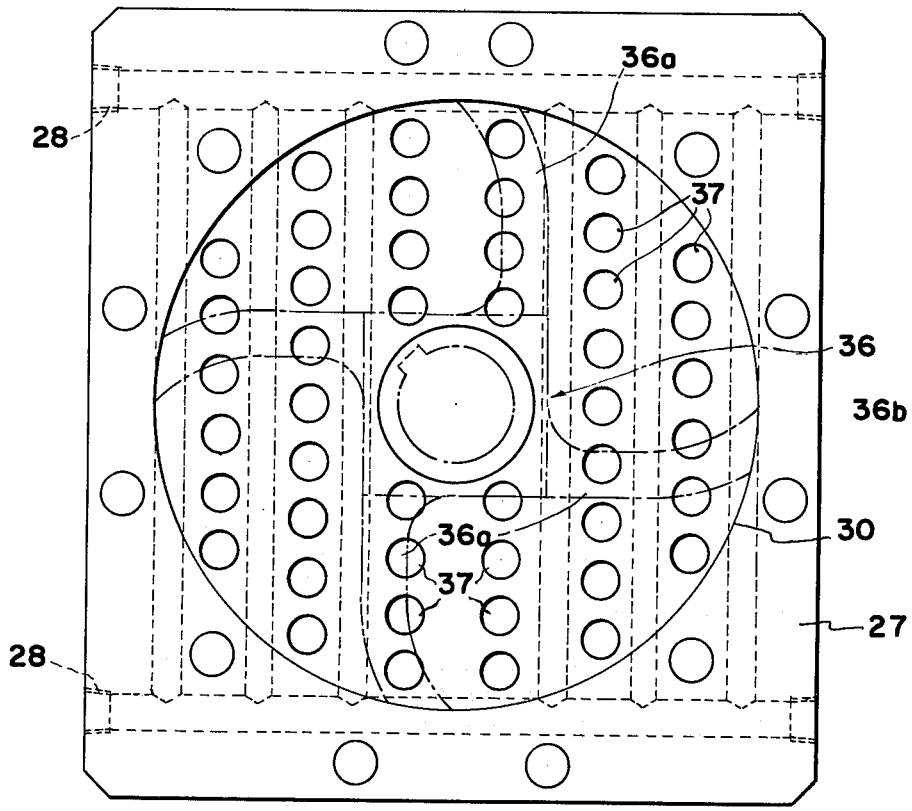
FIG. 3 is a transverse cross sectional view, taken on the line 2—2 thereof.
Figure 2:
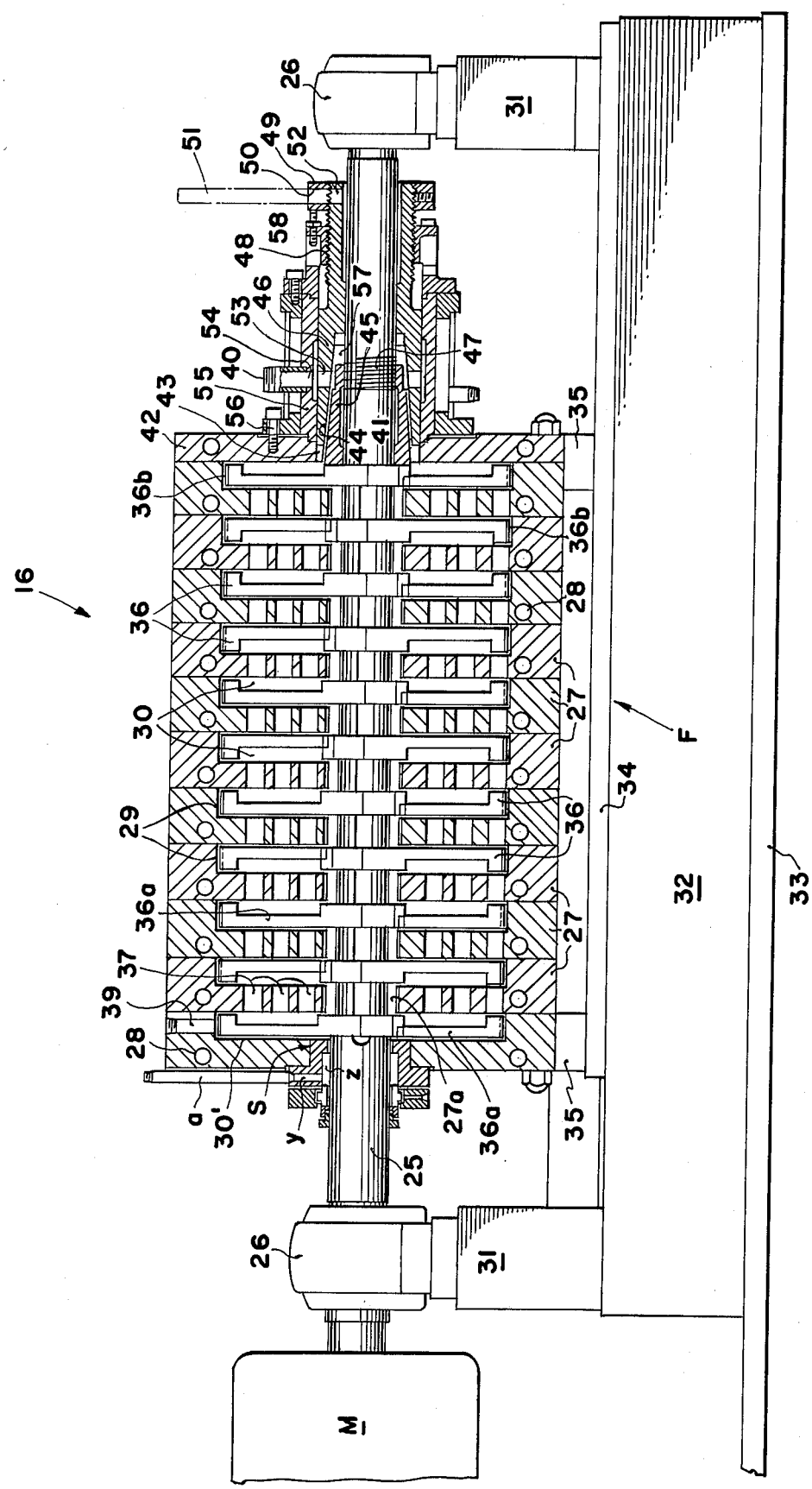
FIG. 2 is a side elevational view of the processing vessel in which the gas incorporation takes place.

Referring now more particularly to FIG. 2, wherein the reactor 16 is shown in more detail, a central shaft 25 is provided, supported by bearings 26 at either end. It is driven by a motor M at a relatively low speed, in the range of 50 to 100 rpm. Such speeds at 100 rpm produce peripheral velocities in the neighborhood of 250 feet per minute as distinguished from speeds in the range of 3000 feet per minute in the Bowman process. Shaft 25 extends through openings 27a, provided in a series of stationary heat transfer plates 27, provided with coolant circulating passages 28 which are supplied with circulated cooling fluid from the cooling watering unit 24. It will be noted that the plates 27, which do not rotate with shaft 25, are recessed as at 29 to provide rotor chambers 30 in which rotor severing knives 36, keyed to the shaft 25, are provided. A frame generally designated F is provided for supporting the bearings 26 via blocks 31 and beams 32, supported on a bed 33. A beam 34 fixed on beams 32 supports the stationary heat transfer plates 27 via blocks 35. It will be noted that each of the transfer plates 27 also includes material subdividing ports 37, arranged in a pattern such as shown in FIG. 3. Provided in the left endmost plate 27, is an entry port 39 for the entry of the viscous candy material via line 19. The outlet port is at the opposite right end of the reactor 16 at 40, and a discharge passage 41 leads from the end of the endmost downstream chamber to the outlet 40 at the opposite end of the machine as shown. At the left end of the unit 16, a seal member generally designated S, is provided and air line $a$ is shown as admitting air under pressure through the passage $y$ to a sealed chamber $z$.

In practice, the candy mix is continuously pumped to the inlet 39. Air under pressure, i.e. up to about 300 p.s.i., which is to be incorporated in the candy mass in the form of air bubbles, is admitted through the air line $a$, the passage $y$, and the chamber $z$, past the inner periphery of the seal S to the first rotor chamber 30'. By admitting the air under pressure to the seal S, a dual function is achieved. Not only is the air readily supplied to the first chamber 30, but because of its pressure, it prevents material from entering the seal S, and hardening to interfere with the operation of the machine.

The rotors 36 may be constructed in the manner indicated in FIG. 3, with a plurality of arms 36a having what may be termed cutting edges 36b. These arms 36a continuously wipe the candy mass over the heat exchange surfaces of the stationary heat exchange plates 27. They also slice the air bubbles which are formed in the highly viscous molten mass with the introduction of air under pressure to the leading chamber 30', and thus comminute the air bubbles to provide an increased number of air bubbles of smaller size in the candy mass.

A further function of the rotors 36 is to remix the material that has been wiped on the heat transfer surfaces of plates 27 with the main mass of material to obtain an average temperature of the mass which is best suited to air bubble elongation and subdivision. The material proceeds linearly through the openings 37 in an axial direction from left to right, from rotor chamber 30 to rotor chamber 30. The effect of drawing subdivided portions of a material at this viscosity through openings 37 is to stretch or elongate the material and the air bubbles incorporated therein. However, it should be understood that the process also involves continuously wiping a part of the candy mass against consecutive heat removing surfaces after each severing procedure and remixing it to achieve an average temperature in the mass suited to air pocket slicing.

Finally, when the candy mass is discharged out discharge pipe 40 to atmosphere, the bubbles are micron size and what remains is essentially a stable, low density viscous candy mass. Essentially, in the unit 16, the work energy imparted and, in some cases, also the heat of crystallization, is removed so that the air bubbles remain small and do not migrate out of the candy mass. Also typically cooling will be controlled so there is a gradual temperature loss in the material as it proceeds through the machine, and so its viscosity remains high at substantially its viscosity of release from the cooker, or higher, and its viscosity throughout its passage through the unit 16 may be termed the "bubble slicing" viscosity.

It will be noted that at the discharge end of the machine, the end plate 42 has an enlarged opening 43. The candy mass then must proceed out a tapering flow restricting passage 44 provided between an inner metering sleeve 45 and an outer metering sleeve 46. The outer sleeve 46 is mounted for axial adjustment on a threaded portion 47 of shaft 25 and is exteriorly threaded as at 48 to accommodate a handle ring 49 thereon, having opening 50 for an adjusting handle 51 which can also detachably enter an opening 52 provided in the sleeve 46. An opening 53, provided in the sleeve 46 communicates with an opening 54 in a cage member 55 for supporting outer sleeve 46, which can be bolted to the end plate 42 as at 56. A set screw device 58 permits the position of sleeve 46 to be held after its adjustment to desired position to impose the desired back pressure on the candy mass. The sleeve 45, of course, rotates with the shaft 25, whereas the sleeve 46 is supported stationarily via cage 55 by the end plate 42. The material proceeds out opening 43 and via passage 44 to a chamber 57 leading to the ports 53, 54 and discharge pipe 40. To enlarge or reduce the size of annular passage 44, the position of sleeve 46 can be adjusted axially relative to sleeve 45 by manipulating handle 51, after manipulating the set screw device 58.

The purpose of providing the restricted annular passage 44 is to create a back-pressure which acts in opposition to the pressure pumping the mixture through the machine and also the air pressure. Thus, while proceeding through the reactor unit 16, the viscous candy mass can be uniformly pressurized and a control of pressurization is provided which assures that the mass does not move through the machine too quickly to incorporate the desired amount of air. Typically, an increased pressure permits a greater quantity of smaller air bubbles to be incorporated in the candy mass and makes it possible to release a candy mass which may be fifty percent air and fifty percent candy. By keeping the candy in the reactor under a constant controlled pressure, substantially fine bubbles can be created such that when the candy is released to atmosphere and expands, a coalescence of bubbles does not occur. The pressure utilized in the chamber is no greater than the pump pressure moving the mass in to keep the reactor 16 filled and the air is metered in at this pressure.

To contrast what is occurring in the present system with the prior art systems, attention is directed now to FIG. 4 wherein the long, well-known stretch and fold system to entrap air in candy is schematically illustrated. Each time the candy is folded, air is, of course, captured but the problem is that this operation is a batch operation rather than a continuous one. Processes of this type, accomplished either manually or with a folding machine, have been used for many years.

FIG. 5 illustrates the effect obtained using the method described in the prior art Bowman U.S. Pat. No. 2,197,919, earlier mentioned, which utilizes an air bubble smashing principle. Here the paddles are driven at a high rate of speed in the neighborhood of 2,000 rpm and clearly impart considerable work energy heat to the product. The product proceeding past the impacting paddles is of low viscosity and so the bubbles would not elongate when passed through the restrictive air ports. A higher viscosity is required in a candy mass in which incorporated air can produce elongated bubbles and this method is to be distinguished from the bubble smashing principle employed in the prior art Bowman patent.

FIG. 6 is a schematic view illustrating what happens in the system of the present invention, and essentially is an exploded view illustrating the elongation of the bubbles at *a* and the action of the rotor knife edges in slicing them into a far greater number of components at *b*. With applicant's method, a minimum work energy heat input is involved with rotation of the low viscosity rotor slicers 36 through the viscous candy mass. Because the candy is maintained in a condition of relatively higher viscosity, the material released is far more stable in that the bubbles do not tend to coalesce or migrate, even though upon release to atmosphere they tend to grow in size up to two and one-half fold. Essentially the pressure to which the material is subjected as it moves through the unit 16 is a function of the control discharge passage 44, because the flow pressures generated by the pump, and supplied by the air under pressure, adjust to the internal pressure caused by the restricted valve passage 44. The present controlled process permits the bubbles to grow to the desired degree upon release to the pressure of the atmosphere.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:
1. In a candy making process including the steps of:
 (a) heating a candy mass to prepare a viscous melt product and discharging the heated mass in a stream;
 (b) introducing the mass to a closed chamber and homogeneously intermixing a gas such as air with said melt product stream to form gas bubbles therein while moving the mass through said chamber under pressure, the improvements wherein:
 (c) sequentially, as the product moves through the chamber, and in a repeated series of steps as the viscosity is maintained at a high level, the bubbles are repeatedly elongated and then sliced when the product is forced through reduced size openings and a low velocity knife moves through the product thereafter at a speed such as to slice the elongated bubbles, as distinguished from smashing them;
 (d) cooling the product to remove "work energy" heat therefrom during said slicing steps as the mass moves through the chamber and maintain the viscosity of the mass at a relatively high viscosity suited to slicing which prevents migration and coalescence of the bubbles; and
 (e) discharging the bubble incorporating mass from the chamber to atmosphere at substantially the relatively high bubble slicing viscosity.

2. The process of claim 1 in which a controlled back pressure is applied to said mass at the discharge end of the chamber to create a uniform pressure condition in the mass as it proceeds through the chamber.

3. The process of claim 1 in which the viscosity of the mass is maintained in the range 1000 to 100,000 cps.

4. The process of claim 1 in which air is the gas which is introduced under a pressure up to about 225 p.s.i.

5. The process of claim 1 wherein the candy is of a type which hardens upon cooling to a hardness more than that of chewy candies.

6. The process of claim 1 in which rotary slicing knives are moved through the product at a low velocity in the neighborhood of 50-100 r.p.m. to accomplish the slicing.

7. The process of claim 6 in which the chamber is of the type wherein the knives are mounted on a shaft extending through the chamber and supported by bearings; and the gas is initially introduced to one of the bearings to prevent material from moving from the chamber into the bearing, prior to being incorporated with the melt product stream.

8. In a reactor for use in candy making and the like wherein a gas is to be intermixed with a flow stream such as a viscous candy mass and including:
 a vessel having end walls defining a charge end and a discharge end;
 a shaft extending axially in the vessel and having a series of axially spaced rotors thereon;
 heat transfer partition surfaces in said vessel partitioning it into a series of compartments in which said rotors are disposed to wipe the mass on the partition surfaces, there being openings axially in said surfaces to permit axial flow of material from compartment to compartment;
 enclosed bearing means for said shaft at the charge end of the vessel and opening into said vessel;
 means for introducing the flow stream to the charge end of the vessel; and
 a discharge at the discharge end of the vessel;
 the improvement wherein means is provided for introducing the gas directly to the bearing means first of all to prevent the mass from entering the bearing means, prior to permitting the gas to enter the vessel to intermix with the mass.

* * * * *